United States Patent [19]

Roberts et al.

[11] 4,332,707

[45] Jun. 1, 1982

[54] SYNERGISTIC SOLVENT SOLUTION OF XYLENE AND STODDARD SOLVENT FOR CHEMICALLY MODIFIED ASPHALT

[75] Inventors: Michael G. Roberts; Joseph F. Tanner, both of Newark, Ohio

[73] Assignee: Owens-Corning Fiberglas Corporation, Toledo, Ohio

[21] Appl. No.: 249,592

[22] Filed: Apr. 1, 1981

[51] Int. Cl.³ ............................................. C08L 95/00
[52] U.S. Cl. ................................. 524/476; 106/278; 427/388.1; 427/388.5; 428/462
[58] Field of Search .................. 260/28.5 AS, 28.5 R, 260/28.5 A, 4 AR, 5; 106/278; 427/388.1, 388.5

[56] References Cited

U.S. PATENT DOCUMENTS

| | | | |
|---|---|---|---|
| 4,175,978 | 11/1979 | Marzocchi et al. | 106/281 R |
| 4,248,936 | 2/1981 | Marzocchi et al. | 428/391 |
| 4,273,685 | 6/1981 | Marzocchi et al. | 260/28.5 AS |

*Primary Examiner*—Theodore E. Pertilla
*Attorney, Agent, or Firm*—Ronald C. Hudgens; Robert F. Rywalski

[57] ABSTRACT

Homogeneous, substantially single phase, stable solutions of the reaction product of asphalt, a vinyl aromatic monomer, and a rubbery polymer are provided. These solutions may be sprayed onto metal surfaces to provide corrosion resistant coatings thereon and also coatings which have a sound dampening quality. The solvent employed to form the solution is a mixture of xylene and Stoddard solvent or a mixture of xylene, Stoddard solvent and heptane or hexane, or a mixture of heptane and hexane.

4 Claims, No Drawings

SYNERGISTIC SOLVENT SOLUTION OF XYLENE AND STODDARD SOLVENT FOR CHEMICALLY MODIFIED ASPHALT

TECHNICAL FIELD

The present invention relates to chemically modified asphalt compositions and, more particularly it relates to solvent solutions thereof. Even yet more particularly, the present invention relates to coating metal substrates with such solvent solutions to provide a corrosion resistant and/or sound dampening coating thereof.

BACKGROUND AND SUMMARY

Chemically modified asphalt compositions which are the reaction product of asphalt, a polymerizable vinyl aromatic monomer and a rubbery polymer are well known in the art. In this respect, reference may be had to U.S. Ser. No. 045,047 which is hereby incorporated by reference. The compositions can be used to coat glass and are of great utility in highway maintenance. Typically, such chemically modified asphalt compositions are prepared by reacting, with asphalt, a vinyl aromatic monomer in an amount of about 0.5 to about 35%, based on the weight of asphalt, and a rubbery polymer in an amount of about 0.5 to about 30% by weight, based upon the weight of the asphalt. The reaction is done at an elevated temperature for a sufficient period of time to substantially complete the reaction. Preferably, the temperatures employed will be on the order of about 340° F. to about 355° F. (171° C. to about 179° C.), with a typical time being on the order of about 24 hours. Preferred asphalt materials are the paving grade asphalt materials such as, for example, AC-20, and the preferred rubbery polymer is a copolymer of styrene and butadiene, such as, for example, that available from Phillips Petroleum under their designation Solprene 1205C material.

In accordance with the present invention, homogeneous, substantially single phase, stable organic solvent solutions of such reaction products are provided. Such solutions may be conveniently applied using conventional technology, such as, for example, conventional spray application technology, onto metal substrates to provide a corrosion resistant coating thereon and/or a sound dampening coating thereon.

DESCRIPTION

The preferred chemically modified asphalt material contemplated for use herein is the reaction product of about 77.5% by weight of asphalt (AC-20), about 10% by weight of styrene and about 12.5% by weight of Solprene 1205C material as the rubbery polymer. This chemically modified asphalt is formed by reacting the above ingredients at a temperature between about 340° F. to 355° F. (171° C. to 179° C.) for a period of time of about 24 hours. Generally representative, however, of suitable vinyl aromatic monomers are those of the formula $CH_2=CH-R$, wherein R is an aromatic group, such as a phenyl group, a substituted phenyl group wherein the substituent is any one of an amino group, a cyano group, a halogen group, a $C_1-C_3$ alkoxy group, a $C_1-C_3$ alkyl group, a hydroxy group, a nitro group, etc. R can also be a heterocyclic aromatic group such as a pyridyl group, a quinolyl group and the like. In general, R is an aromatic group containing 6–12 carbon atoms. As the rubbery polymer, use can be made of a number of elastomeric materials well known to those skilled in the art, including the natural rubbers as well as synthetic rubbers. Suitably, synthetic rubbers can be homopolymers of a conjugated diene, e.g., butadiene, isoprene, chloroprene, etc., as well as various polymers which are substituted with a functional group containing a labile hydrogen atom. For example, various hydroxy, amino and like substituted homopolymers of conjugated dienes may likewise be used in the practice of this invention. Preferably, however, the rubbery polymers are elastomeric materials formed by copolymerization of one or more of the conjugated dienes described above with one or more ethylenic monomers, such as styrene, as well as hydroxy, amino and mercapto substituted derivatives thereof, acrylonitrile, methacrylonitrile, acrylic acid, methacrylic acid, etc. Thus, included are, as indicated above, the butadiene styrene rubbers, butadiene acrylonitrile rubbers, etc. Hydroxy terminated copolymers are likewise useful in the practice of this invention.

When reference is made herein to a solvent solution of chemically modified asphalts which are the reaction products of the materials of the type indicated above, no fine technical distinction is intended between true solutions and dispersions. Suffice it to say that the solutions, as contemplated herein, are homogeneous, stable, and they are substantially a single phase. In passing it should be mentioned that all solvents are not equivalent for purposes of the present invention. For example, Stoddard solvent and mineral spirits are unsuitable organic solvents because they create a gellation problem with the above type indicated chemically modified asphalts. Additionally, heptane, hexane, and xylene are likewise unsuitable because they have a pronounced propensity to phase separate after standing, for example, upon standing for a day or two.

The solvents which will be employed in the present invention are (a) a mixture consisting essentially of about 40–80% by weight xylene and about 20–60% by weight Stoddard solvent, or (b) a mixture consisting essentially of xylene, Stoddard solvent and hexane or heptane, or a mixture of hexane and heptane, with the xylene being present in an amount of about 40–80% by weight, Stoddard solvent being present in an amount of about 5–35% by weight, and the hexane or heptane, or mixture of hexane and heptane, being at a maximum amount of about 25% by weight. Suitably, the hexane or heptane, or mixture of heptane and hexane, may be present in an amount of about 1% by weight to about 25% by weight, e.g., from about 5–25% by weight.

Suitably, the solutions will be prepared by employing a weight ratio of the chemically modified asphalt to solvent in the range of about 4:1 to about 4:6, desirably in the ratio of about 7:3 to about 4:6 and most desirably in a ratio of about 6:4 to about 1:1. The solutions are simply prepared by combining the reaction product of asphalt, a polymerizable vinyl aromatic monomer and a rubbery polymer and the above solvents, with agitation being applied for a sufficient period of time to form a homogeneous solution. This may be done at room temperature, or above, and it may likewise be done at atmospheric pressure or at an elevated pressure. The preferred method will be to heat the chemically modified asphalt, for example, to a temperature in excess of 300° F. (149° C.), commonly 350° to 400° F. (177° to 204° C.) and to add this molten material to a vessel which is equipped with a reflux condenser. This temperature will generally be maintained, with agitation, until approximately 20% of the solvent is added and then heating may be discontinued, as the solution will then be sufficiently fluid to allow for convenient agitation without the necessity of heat. Preferably, the vessel will be maintained at an elevated pressure, for example, about 25 to about 30 psig. Such resulting solutions are homogeneous and stable in that they, upon standing for prolonged periods of time, will remain as substantially single phase solutions.

The above-indicated solutions may be applied by any conventional spraying technique onto metal substrates to provide a corrosion resistant coating thereon and/or a coating which has sound dampening characteristics. Thus, for example, the above solutions are outstandingly adapted for the rustproofing and the undercoating of automobiles. They may likewise be employed to coat machines for sound dampening purposes. Any of a wide and numerous variety of metal substrates may be coated with these solutions so as to provide, after solvent evaporation, a coating thereon. Typically, the coatings will have a thickness of about 3 mils to about 60 mils. Exemplary of numerous metals which may be coated in this manner include iron, aluminum, nickel, chrome, copper, lead and the like, and especially fine results will be found with application to iron base alloys, for example, steel, and non-ferrous based metal alloys, such as, for example, aluminum based alloys, nickel based alloys, chrome based alloys, copper based alloys, and lead based alloys.

As will be apparent from the foregoing, by employing the solvents indicated, problems and difficulties which are encountered with other solvents, for example, gellation problems and phase separation problems, will now be obviated. The significance of this will be readily apparent to those skilled in the art in that these solvent solutions may be allowed to stand for prolonged periods of time without fear of gelling or phase separation and, because of their homogeneous nature, can be quite conveniently applied to the various metallic substrates.

Having described the present invention, it will, of course, be readily apparent that modification is possible which, pursuant to the Patent Statutes and Laws, do not depart from the spirit and scope thereof.

We claim:

1. A homogeneous, stable organic solvent solution of the reaction product of asphalt, a polymerizable vinyl aromatic monomer, and a rubbery polymer, said solvent being selected from the group consisting of (a) a mixture consisting essentially of about 40-80% by weight xylene and about 20-60% by weight Stoddard solvent, and (b) a mixture consisting essentially of xylene, Stoddard solvent and hexane or heptane, or a mixture of hexane and heptane, with xylene being present in an amount of about 40-80%, the Stoddard solvent being present in an amount of about 5-35%, and said hexane or heptane, or mixture of hexane and heptane, being present in a maximum amount of about 25%.

2. The method comprising applying the solvent solution of claim 1 onto a metal substrate and evaporating the solvent so as to leave a residual coating of said reaction product thereon.

3. A method which comprises combining the reaction product of asphalt, a polymerizable vinyl aromatic monomer and a rubbery polymer with a solvent selected from the group consisting of (a) a mixture consisting essentially of about 40-80% by weight xylene and about 20-60% by weight Stoddard solvent, and (b) a mixture consisting essentially of xylene, Stoddard solvent and hexane or heptane, or a mixture of hexane and heptane, with xylene being present in an amount of about 40-80%, the Stoddard solvent being present in an amount of about 5-35%, and said hexane or heptane, or mixture of hexane and heptane, being present in a maximum amount of about 25%, and agitating the combined material for a time sufficient to form a homogeneous solution.

4. The solution of claim 1 wherein said polymerizable vinyl aromatic monomer is styrene and wherein said rubbery polymer is a copolymer of styrene and butadiene.

* * * * *